(12) United States Patent
Leblang (10) Patent No.: US 8,427,328 B1
(45) Date of Patent: Apr. 23, 2013

(54) SMART HARNESS FOR ELECTRONIC DEVICES (75) Inventor: Jonathan A. Leblang, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 510 days.

(21) Appl. No.: 12/719,927

(22) Filed: Mar. 9, 2010

(51) Int. Cl.
*G08B 21/00* (2006.01)

(52) U.S. Cl.
USPC .................................................. 340/635

(58) Field of Classification Search .............. 340/568.1, 340/635, 571, 539.23, 539.15, 10.1, 7.2; 455/421, 456.1
See application file for complete search history.

(56) References Cited

U.S. PATENT DOCUMENTS

| | | | | |
|---|---|---|---|---|
| 5,757,271 A * | 5/1998 | Andrews | ..................... | 340/568.1 |
| 6,151,493 A * | 11/2000 | Sasakura et al. | .............. | 455/421 |
| 6,690,277 B1 * | 2/2004 | Hansen et al. | .............. | 340/568.2 |
| 7,009,512 B2 * | 3/2006 | Cordoba | .................. | 340/539.23 |
| 7,190,264 B2 * | 3/2007 | Brown et al. | ............ | 340/539.23 |
| 2005/0134431 A1 * | 6/2005 | Perez-Garcia et al. | ........ | 340/7.2 |
| 2010/0118144 A1 * | 5/2010 | Fawcett et al. | ................ | 348/143 |

* cited by examiner

*Primary Examiner* — Phung Nguyen
(74) *Attorney, Agent, or Firm* — Lee & Hayes, PLLC (57) ABSTRACT

A smart harness may be coupled to an electronic device. The smart harness may communicate with the electronic device by an exchange of signals when the harness is secured to the electronic device. The electronic device and/or smart harness may operate in various modes based on the communications or lack of communications, such as when the exchange of signals is interrupted. The various modes may be selected from a non-exhaustive group of a limited functionality mode, an alarm mode, a full feature mode, and a non-active mode.

28 Claims, 8 Drawing Sheets

SMART HARNESS FOR ELECTRONIC DEVICES

BACKGROUND

Electronic devices such as electronic book reader devices ("eBook reader devices"), cellular telephones, personal digital assistant (PDA), portable media players, tablet computers, netbooks, and the like, are sometimes displayed in public for use by various people. For example, an electronic device may be displayed by a retailer for use (interaction) by prospective buyers. In another example, an electronic device may be made available for use at a library, business, or other entity for a limited duration and/or within a determined physical boundary. Often, when electronic devices are made available to the public (or other non-owners), an anti-theft device is secured to the electronic device to prevent unauthorized removal of the electronic device.

Some variations of anti-theft devices employ one or more of physical restraints (e.g., cables, brackets, immobile display cases, etc.), proximity indicators (radio frequency identification (RFID), etc.), and visual indicators (tags, oversized cases, etc.) to reduce authorized removal of item (e.g., an electronic device). Factors that may be used to select an anti-theft device may include a form factor of the electronic device, placement of user interfaces (e.g., buttons, controls, etc.) and attachment ports, and/or an intended use of electronic device by a user. For example, an electronic device may have buttons disposed around a perimeter of a device's case that enable user input. An electronic device may also have ports to connect to external peripherals or other electronic devices along the edges of the device.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

A smart harness may be coupled to an electronic device such as electronic book reader devices ("eBook reader devices"), cellular telephones, personal digital assistant (PDA), portable media players, tablet computers, netbooks, etc. The smart harness may communicate with the electronic device by an exchange of data (signals) when the harness is secured to the electronic device. The electronic device and/or smart harness may operate in various modes based on the communications with the smart harness. For example, when the smart harness is coupled to the electronic device, the electronic device may receive a status signal that instructs the electronic device to operate in a particular mode, such as a full feature mode. Upon removal of the harness from the electronic device, which may terminate transmission of communications, the electronic device may display a message indicating the item is stolen, etc., and may provide limited additional functionality.

Similarly, the smart harness may operate in various modes based on communications between the harness and the electronic device. For example, the smart harness may trigger an alarm upon removal of the harness from the electronic device based on a communication, or lack thereof, from the electronic device. In additional embodiments, the various operational modes of the electronic device may include restricted functionality of the electronic device when coupled with the smart harness, such as to operate in a testing mode, a demonstration mode, a library mode, and so forth.

The techniques and apparatuses described herein may be implemented in a number of ways. Example implementations are provided below with reference to the following figures.

Figure 1:
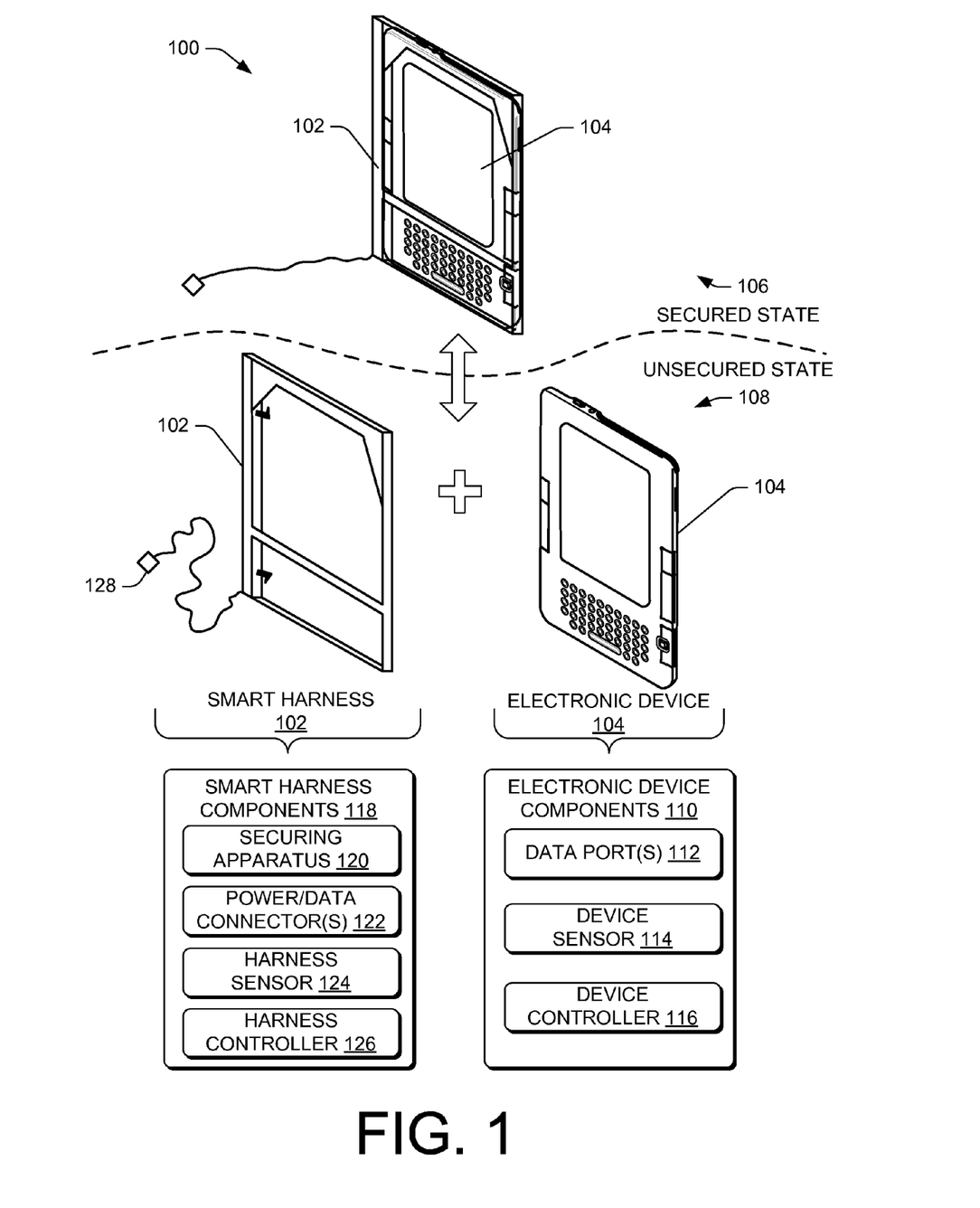
FIG. 1 is a schematic diagram of an illustrative system usable to alter an operational mode of an electronic device and/or a harness.

FIG. 1 is a schematic diagram of an illustrative system 100 usable to alter an operational mode of an electronic device and/or a smart harness. In accordance with one or more embodiments, a smart harness 102 ("the harness") is configured to securely couple to an electronic device 104. The term "securely couple" and "couple" may include locking and/or non-locking attachment features that may be incorporated in the smart harness 102, the electronic device 104, or both to couple the smart harness and the electronic device. When the harness 102 is coupled to the electronic device 104, the electronic device may reside in a secured state 106. In the secured state 106, the harness 102 and the electronic device 104 may exchange data (signals), which may determine an operation mode of the harness 102 and/or the electronic device 104. The harness 102 and the electronic device 104 may reside in an unsecured state 108 upon removal of the harness 102 from the electronic device 104.

The electronic device 104 may receive inputs via buttons, a touch screen, a microphone, and/or other features to enable user input. The electronic device may provide an output via a display, speakers, haptic feedback, and so forth.

In some embodiments, the electronic device 104 has electronic device components 110 that include one or more data port(s) 112, a device sensor 114, and/or a device controller 116. The data port(s) 112 may be wired or wireless ports that enable exchange of data with the harness 102 or other components. In some instances, the data port(s) 112 may provide a power supply (either dedicated or shared-use with anther port).

The device sensor 114 may monitor data to determine whether the electronic device 104 is in the secured state 106 or the unsecured state 108, based in part on communications with the harness 102 via the data port(s) 112. The device controller 116 may determine an operational mode of the electronic device 104 based in part on information of the device sensor 114.

In various embodiments, the harness 102 is configured with smart harness components 118 that include a securing apparatus 120, power/data connector(s) 122, a harness sensor 124, and/or a harness controller 126. The securing apparatus 120 may include features of the harness 102 that may enable coupling the harness 102 to the electronic device 104 and/or coupling the harness to an anchor 128. In some embodiments, the harness 102 may include a frame that is complementary to a form factor of a body of the electronic device 104 such that the harness 102 may surround the electronic device (e.g., a clamshell type case/restraint, etc.). The frame may include apertures to enable access to features of the electronic device such as user interface controls, etc.

The power/data connector(s) 122 may enable connections between the data port(s) 112 of the electronic device 104 and/or other ports proximate the anchor 128 such as a power supply, a USB base, Ethernet base, etc. For example, the harness 102 may include a USB connector that plugs into a USB port on the electronic device 104 to provide power and exchange data with the electronic device 104. The harness 102 may also plug into standard 120V, 240V, 12V, USB, etc. socket to supply power to the electronic device via the USB connector.

In some embodiments, the harness sensor 124 may monitor data to determine whether the harness 102 is in the secured state 106 or the unsecured state 108, based in part on communications with the electronic device 104 via the power/data connector(s) 122. The harness controller 126 may determine an operational mode of the harness 102 based in part on information of the harness sensor 124. For example, the harness controller 126 may sound an alarm, send a notification to a third party, and/or provide other actions after the harness controller 126 receives information from the harness sensor 124 that indicates a change in the signal, which ultimately may result in a change in operational modes. In some embodiments, some or all of the hardware and/or software of the harness sensor 124 and/or the harness controller 126 may reside with the electronic device. For example, the electronic device 104, when securely coupled by the harness 102, may "power" or otherwise enable the harness to perform some or all of the functionality described above.

Illustrative Apparatuses

Figure 2:
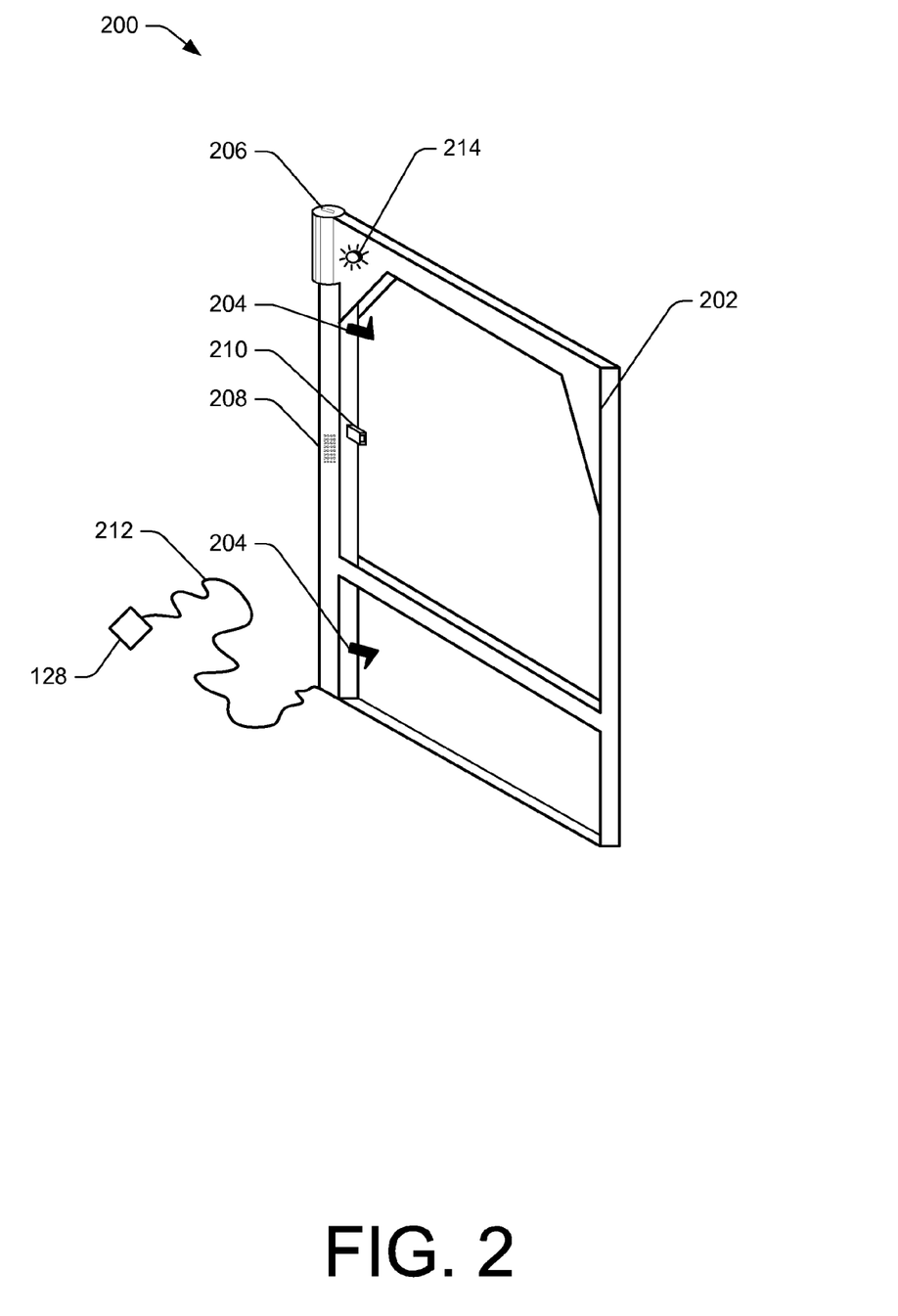
FIG. 2 is a perspective view of an illustrative harness that includes a communication port to exchange data with an electronic device.

FIG. 2 is a perspective view of an illustrative smart harness 200 ("the harness 200"). The harness 200 may include more, fewer, or the same features and/or components as the harness 102 presented in FIG. 1. As used herein, the harness 102 and the harness 200 may be used interchangeably.

In accordance with one or more embodiments, the harness 200 may include various security features. The harness 200 may include a frame 202 to enclose a portion of the electronic device 104 of FIG. 1. The frame may be formed to complement a form factor of the electronic device 104, permit access to some or all features of the electronic device 104 (user interface, data ports, etc.) and provide a durable and secure attachment to the electronic device 104. In one implementation, the frame may have a clamshell type form. In some embodiments, the frame may include protective features that protect the electronic device 104, when inside the harness 200, from damage (e.g., from a drop, liquids, etc.).

In some embodiments, the harness may include couplers 204 that insert into a locking fixture of the electronic device to couple the harness 200 to the electronic device 104. The couplers 204 may be spring loaded and in mechanical connection with a locking mechanism 206 to enable engagement and de-engagement of the couplers into and out of the electronic device 104. The locking mechanism 206 may be activated by a key, special tool, combination, or other physical or data triggered actions to enable actuation of the locking mechanism.

In various embodiments, the harness 200 may include the harness controller 126, which may be integrated into the frame or otherwise concealed or hidden from view to reduce a likelihood of unauthorized manipulation of the controller. The controller may be operatively coupled to a speaker 208, which may emit a sound based on instructions from the harness controller 126. For example, the speaker 208 may emit an alarm sound when harness controller 126 indicates unauthorized removal of the harness 200 from the electronic device 104. In some embodiments, the harness controller 126 may transmit a signal to a third party (e.g., a surveillance station, etc.) upon detection of unauthorized removal of the harness from the electronic device. In further embodiments, the harness controller 126 may take any of the aforementioned actions based on a location of the harness 200 even when coupled to the electronic device 104. For example, the harness controller 126, via the harness sensor 124, may determine when the harness is inside or outside of a prescribed boundary (e.g., within a library, retail display location, etc.). When the harness sensor 124 detects that the harness has moved outside/inside of the prescribed zone, the harness controller may take appropriate action (alter operational modes, sound an alarm, etc.).

In some embodiments, the harness 200 may include the power/data connector(s) 122. In some embodiments, a connector 210 may physically plug into the electronic device 104 when the electronic device is plugged into the harness. In some embodiments, the harness 200 and the electronic device 104 may communicate or transfer power via wireless and/or proximity transmissions. In further embodiments, one or more of the couplers 204 may include dual functionality to provide the features of the power/data connector(s) 122.

The harness 200 may include a tether 212 in accordance with various embodiments. The tether may be a cable to secure the harness 200 to the anchor 128. The tether 212 may optionally include data and/or power transmission capabilities via wired or non-wired (e.g., conductive, optical, etc.) connections.

In some embodiments, the harness 200 may include an operational indicator 214 to show that harness 200 is active (e.g., in the secured state 106 of FIG. 1). The operational indicator 214 may be implemented with a light emitting diode (LED), light, or other visible cue.

An illustrative attachment of the harness 200 to the electronic device 104 is described next to illustrate the various components/features of the harness 200 described with reference to FIG. 2. The frame 202 may be unlocked by actuation of the locking mechanism 206. The frame 202 may be opened to enable insertion of the electronic device inside the frame 202. The electronic device may be secured to the frame via the coupler 204, which may be spring loaded or otherwise securely couple to the electronic device 104. Any data/power connectors (e.g., the port 210, etc.) may be plugged into the electronic device to facilitate data exchange or a supply of power. The frame and/or couplers may be secured to the electronic device by locking the frame 202 via the locking mechanism 206. The operational indicator 214 may emit a light when the harness 200 is securely coupled to the electronic device 104 and a valid exchange of data occurs between the harness and electronic device, which is described in further detail below in the section entitled "Illustrative Operation".

Figure 3:
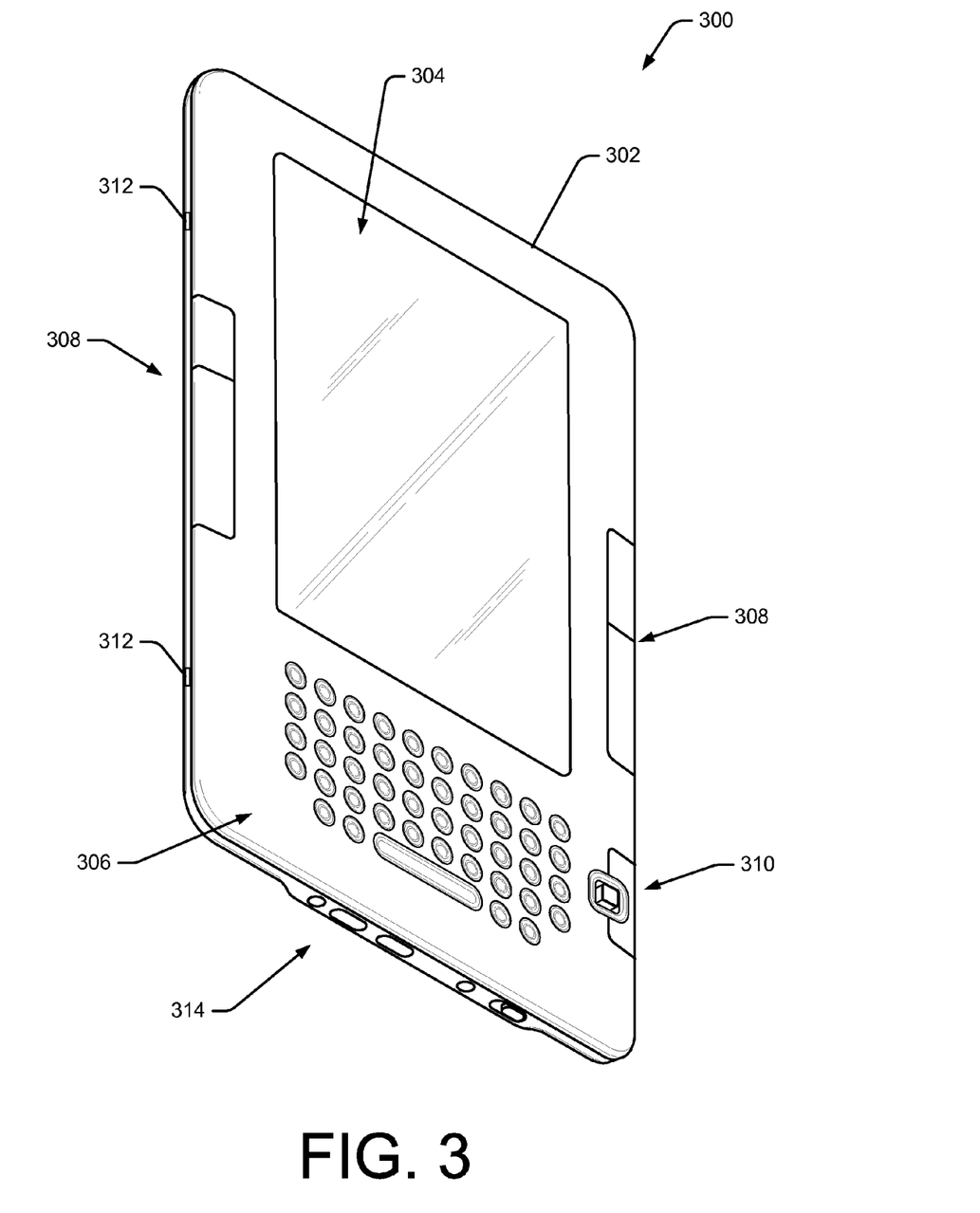
FIG. 3 is a perspective view of an electronic book (eBook) reader device configured for coupling to and exchanging signals with a harness.

FIG. 3 is a perspective view of an eBook reader device 300 configured for coupling to and exchanging signals with a harness. The eBook reader device 300 is one example of an implementation of the electronic device 104 of FIG. 1, and is used to illustrate concepts that may be applied to various other electronic devices as discussed herein.

The eBook reader device 300 has a housing 302, a display 304 for displaying information to a user, and a user interface to allow a user to interact with the eBook reader device. The display 304 may comprise an electronic paper display, a liquid crystal display (LCD), or other types of displays. The user interface comprises a variety of mechanisms for users to interact with the eBook reader device 300 including a keypad 306, multiple buttons 308, and a controller 310. In some implementations, the display 304 may also comprise a user interface mechanism in the form of a touch screen.

In accordance with various embodiments, the housing 302 may include apertures 312 that may enable engagement of the housing 302 to receive a harness, such as the harness 200 of FIG. 2. The harness 200 may securely couple to the eBook reader device 300 when the couplers 204 are inserted and locked into the housing 302 surrounding the apertures 312 to securely couple the harness 200 to the electronic device 104. In some embodiments, the apertures 312 may provide access to data connections, power connectors, or other data inputs/outputs (I/O) (e.g., audio, video, etc.). For example, when the couplers 204 engage the housing 302 via the apertures 312, data ports/connectors may be coupled via the engagement and enable an exchange of signals between the eBook reading device 300 and the harness 200. Other data inputs/outputs and/or power connectors may be included in an I/O section 314.

Figure 4:
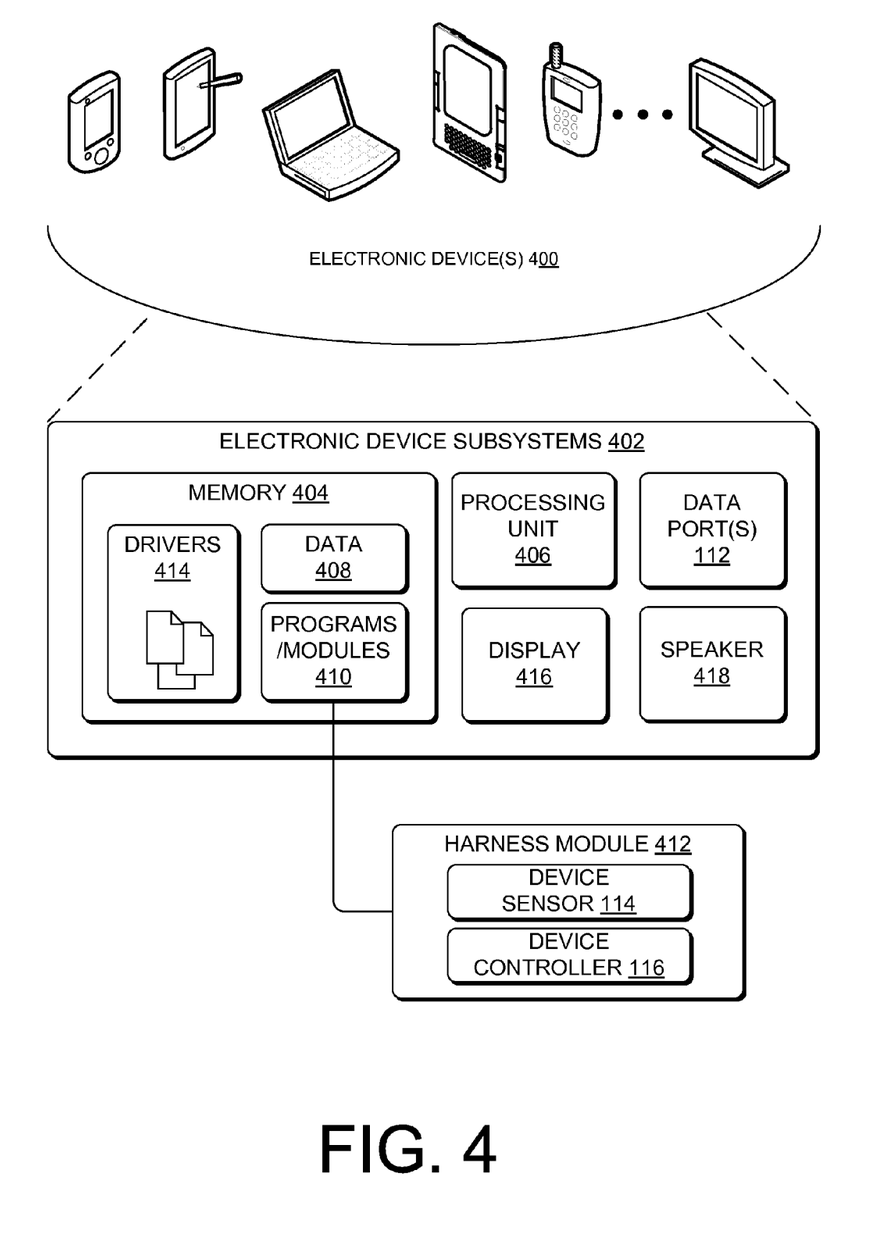
FIG. 4 is a schematic diagram of illustrative electronic devices and corresponding subsystems that enable an exchange of data with the harness of FIG. 2.

FIG. 4 is a schematic diagram of illustrative electronic devices 400 and corresponding subsystems 402 that enable an exchange of data with the harness. In the illustrated implementation, the electronic devices 400 ("the devices") are represented by various electronic devices, which include the electronic device 104 among others devices. A non-exhaustive list of the electronic devices 400 may include a notebook computer, a music player, a personal digital assistant (PDA), a mobile telephone (including smartphones), a tablet computer, an electronic book (eBook) reader, a netbook computer, a gaming console, and/or a monitor (with or without a television tuner), and so forth. However, virtually any other type of electronic device that is capable of receiving or outputting data may be used with the harness 200 described above.

As illustrated, the devices 400 may include the subsystems 402. In some embodiments, the subsystems 402 include memory 404 and a processing unit 406. The processing unit 406 interacts with the memory 404 to facilitate operation of the electronic device 104. The memory 404 may include volatile memory (such as RAM), nonvolatile memory, removable memory, and/or non-removable memory, implemented in any method or technology for storage of information, such as computer-readable instructions, data structures, program modules, or other data. Also, the processing unit 406 may include onboard memory in addition to or instead of the memory 404.

The memory 404, meanwhile, may be used to store data 408, such as data files, audio and/or video media, eBooks, or the like. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The memory 404 may also include software programs or other executable modules ("program/modules") 410 that may be executed by the processing unit 406. Examples of such programs or modules include indexing modules for indexing data, reader programs, control modules (e.g., power management), network connection software, an operating system, sensor algorithms, page turn detectors, and the like.

In some embodiments, the programs/modules 410 may include a harness module 412 that includes the device sensor 114 and the device controller 116. The harness module 412 may enable the electronic device 104 to communicate with the harness 200 to exchange data, change operational modes based on the exchanged data, and perform other operations discussed herein. In various embodiments, the harness module 412 may include programs/modules to enable at least a portion of the functionality of the harness 200. For example, when the harness 200 is securely coupled to one of the electronic device(s) 400, the harness module 412 may supply some or all of the operational logic, power, or other inputs to enable the harness to function as described herein. In this way, the implementations of the harness 200 may be provided with or without programs/modules, etc. to operate in a stand-alone state (without using resources provided by the electronic device(s) 400).

The subsystems 402 may also include drivers 414, which may be computer instructions to perform various operations. One of the drivers 414 may control data input/output via the data port(s) 112. In some embodiments, another one of the drivers 414 may render a visual representation of content on a display 416 while yet another driver may control an emitting of sound from a speaker 418.

In accordance with various embodiments, the device controller 116 may receive an indication from the device sensor 114, via the data port(s) 112, that the harness 200 is securely coupled to the electronic device 104. For example, the harness 200 may transmit a constant or intermittent signal to the device sensor 114 to indicate the secure attachment of the harness 200. In response to the signal, the device controller 116 may enable (or limit) operation of the electronic device in a first mode. However, upon an interruption of the signal, the device controller 116 may modify the operation of the electronic device 104 to a second mode. The device controller 116 may modify the mode of operation by restricting/permitting access to instances of the various programs/modules 410, the data 408, and/or the drivers 414, which may ultimately result in various output via the data port(s), the display 416, and/or the speaker 418.

For example, the harness 200 may be used as a security device in a retail display configuration. When the harness 200 and the electronic device 104 are in the secured state 106, then the device controller 116 may enable restricted use of the programs/modules 410 (e.g., restrict access to system settings, but enable other programs, etc.). After an unauthorized removal of the harness 200 (or other unauthorized action such as a location change), the device controller 116 may direct the electronic device 104 to perform acts such as transmit a wireless signal to a third device via the data port(s) 112 (e.g., message to security station), to display a message on the display 416 (e.g., "stolen", "return to display", etc.), to sound an alarm via the speaker 418, and/or take other actions. Operation of the harness 200 and the electronic device 104 is described in further in the following section.

Illustrative Operation

Figure 5:
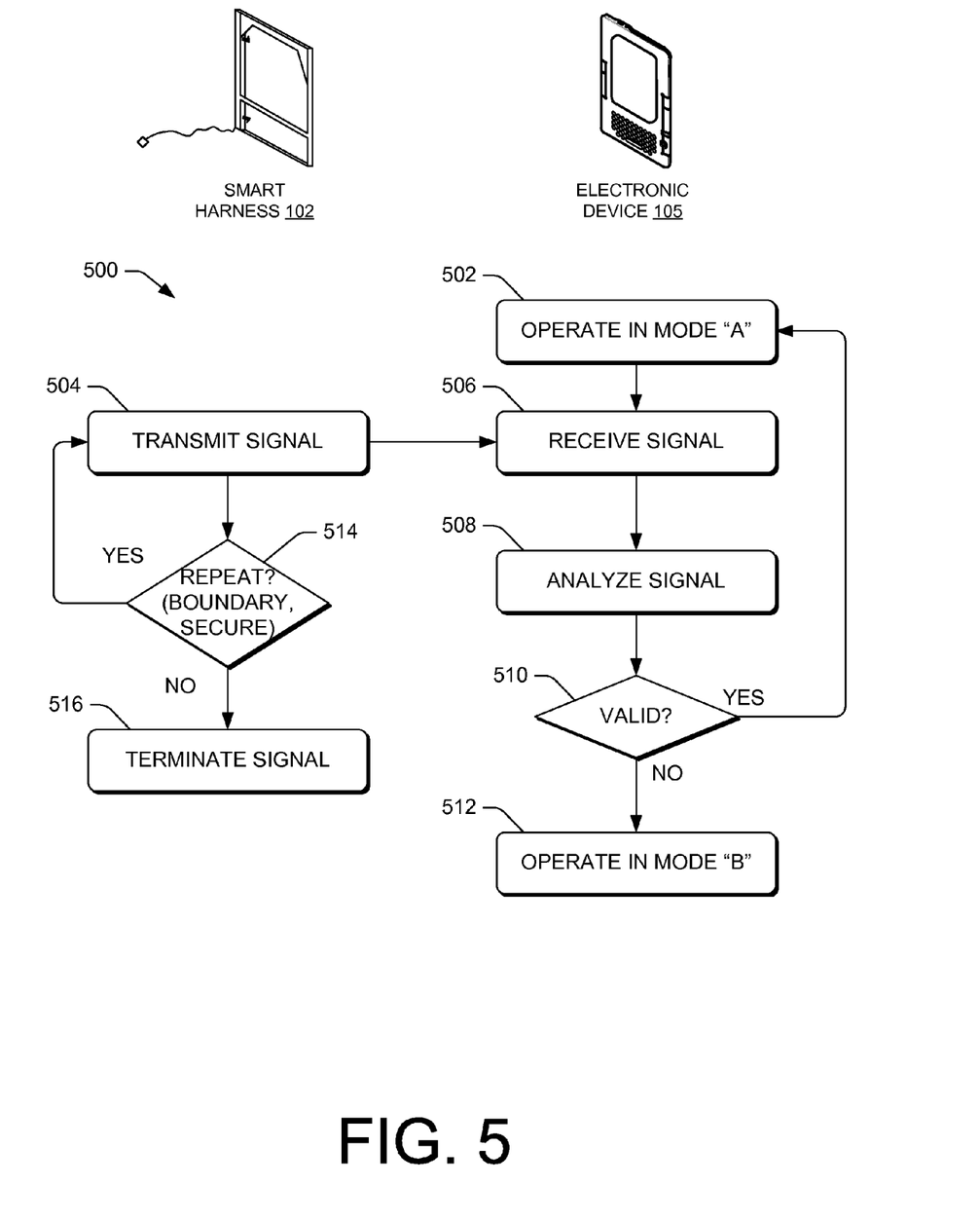
FIG. 5 is a flow diagram of an illustrative process to exchange data between a harness and an electronic device.

FIG. 5 is a flow diagram of an illustrative process 500 to exchange data unilaterally between the harness 102 and the electronic device 104. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 500, shall be interpreted accordingly.

The process 500 is described with reference to FIG. 1, and more specifically, to the harness 102 and the electronic device 104. The operations shown of FIG. 5 are arranged under respective apparatus that may perform these operations. However, the operations may be performed by other apparatus or the apparatuses shown in FIG. 5 may be swapped such that the harness 102 performs the operations listed under the electronic device 104 and so forth.

At 502, the electronic device 104 may operate in a mode "A". The mode "A" may be one of many different operational modes performed by the electronic device 104, which may be determined by the device controller 116. For example, mode "A" may be one of a normal operation mode, a demonstration mode, a library mode, a security violation mode (alarm mode, etc.), and so forth. The particular mode represented by mode "A" may be determined by a deployment of the electronic device (e.g., in a retail setting, library setting, etc.).

At 504, the harness 102 may transmit a signal to the electronic device 104 via one of the power/data connector(s) 122. The signal may be a constant signal (e.g., constant power, continuous signal, etc.), an intermittent signal (e.g. pulsing signal, etc.), or a combination of both. The signal may be a simple or complex signal. A complex signal may be a signal that is code/decoded by the harness 102 and/or the electronic device 104 to prevent unauthorized access to the signal. For example, the signal at 504 may be transmitted to the electronic device 104 via a wireless connection (e.g., Wi-Fi, radio frequency identification (RFID), Bluetooth®, etc.). In this instance, the signal may be coded/decoded to prevent unauthorized duplication of the signal. The signal may also be transmitted via a power connection, data ports, or by other techniques possible via the power/data connector(s) 122.

At 506, the electronic device 104 may receive the signal from the harness 102 via the data port(s) 112 of the electronic device 104.

At 508, the electronic device 104 may analyze the signal. The device sensor 114 may analyze the signal to determine an existence of the signal, an authenticity of the signal, a timeliness of the signal, and/or other attributes of the signal. In this way, the device sensor 114 may confirm that the harness 102 is securely coupled to the electronic device such that the signal is received by the electronic device at 506.

At 510, the electronic device 104 may take action based on a determined validity of the signal based on the analysis at 508. A valid signal may indicate that the electronic device is to continue to operate in mode "A". Conversely, upon detection of an invalid signal at 516 (e.g., untimely, no signal, etc.), the device controller 116 may instruct the electronic device 104 to discontinue operation in mode "A" and begin operation in mode "B" as shown as 512.

In accordance with some embodiments, at the operation 512, the device controller 116 may modify, reduce, or increase functionality of the electronic device 104 based on a deployment of the electronic device. For example, when the electronic device 104 is used in a display setting at a retail location, the mode "A" at block 502 may be an operation in a demonstration mode that enables prospective buyers to evaluate the functionality of the electronic device. Some features may be disabled in mode "A" in this instance to prevent user modification (e.g. system settings, etc.). Mode "B" at 512 may be an unauthorized-use mode where the device controller 116 instructs the electronic device 104 to render a message on the display 416 indicating unauthorized use (e.g., "STOLEN, RETURN IMMEDIATELY . . . ", etc.), emit an sound (e.g., pulsing alarm, etc.), disable some or all of the programs/modules 410, clear a portion of the data 408, or a combination of some or all of these actions.

In some embodiments, at 514, the harness 102 may repeat the signal. The repeat decision may be based, at least in part, on a location of the harness within a predetermined boundary. For example, when the harness 102 is within the boundary, the signal is repeated but when the harness is removed from (or crosses) the boundary, the signal may be terminated at 516. In this way, the repeat decision is based on a multi-factor decision that includes at least an anticipated signal exchange between the harness that is securely coupled to the electronic device and a proximity of the harness (or electronic device) relative to a boundary.

The repeat decision at 514 may be employed with the signal that is constant or intermittent. When the signal is intermittent, the device sensor 114 may analyze a timeliness of the signal at 508. For example, if the harness 102 is removed from the electronic device 104 (or the harness 102 leaves the boundary) and thereby discontinues the signal transmission at 504, the device sensor 114 may determine the signal (or lack thereof) is invalid due to timeliness (no signal received when expected). Thus, the device controller 116 of the electronic device 104 may determine the signal (or lack thereof) is not valid and initiate operation in mode "B" at 512.

At 516, the signal transmission may be terminated by authorized or unauthorized people (e.g., administrators, etc.) or systems. For example, the signal may be terminated at 516 when a person removes, compromises, or alters the harness 102 from the electronic device via an unauthorized action (e.g., without using the locking mechanism 206, etc.). In some instances, the signal may terminate based on a mechanical disconnection (connector removed). In other instances, the signal may terminate based on software instructions, such as by employing a sensor that may instruct a termination of the signal after detecting a compromise to the harness 102. In another example, the signal may terminate at 516 when the harness is moved outside of a prescribed boundary (e.g., outside of a display location, etc.). In this instance, it is contemplated that the harness 102 may not be tethered to the anchor 128 via the tether 212. The signal may be terminated at 516 via authorized means such as by proper removal of the harness 102 (via the locking mechanism 206, etc.) or other authorized actions (e.g., by an administrator, password, etc.).

In still another example, the signal may be a supply of power to the electronic device. Upon removal of the power, the device (relying on battery power) may begin operation in mode "B" at 512. When power is restored to the electronic device 104 (resuming the signal at 504), the electronic device 104 may need to be reset (via a password or other activity by an administrator) to enable the electronic device 104 to resume operation in mode "A" at 502.

Although the operations of the process 500 are described where the electronic device 104 operates in various modes, in some embodiments, the harness 102 may operate in various modes based on a signal received from the electronic device 104. For example, the electronic device 104 may transmit a signal at 504 and the harness 102 may receive the signal at 506, analyze the signal at 508 via the harness sensor 124, and so forth. In addition, although only two modes of operation are shown in FIG. 5, it is contemplated that the electronic device 104 (or the harness 102) may operate in many different modes based on the signal received at 506. In some embodiments, the signal received at 506 may determine the mode in which the respective device operates.

Figure 6:
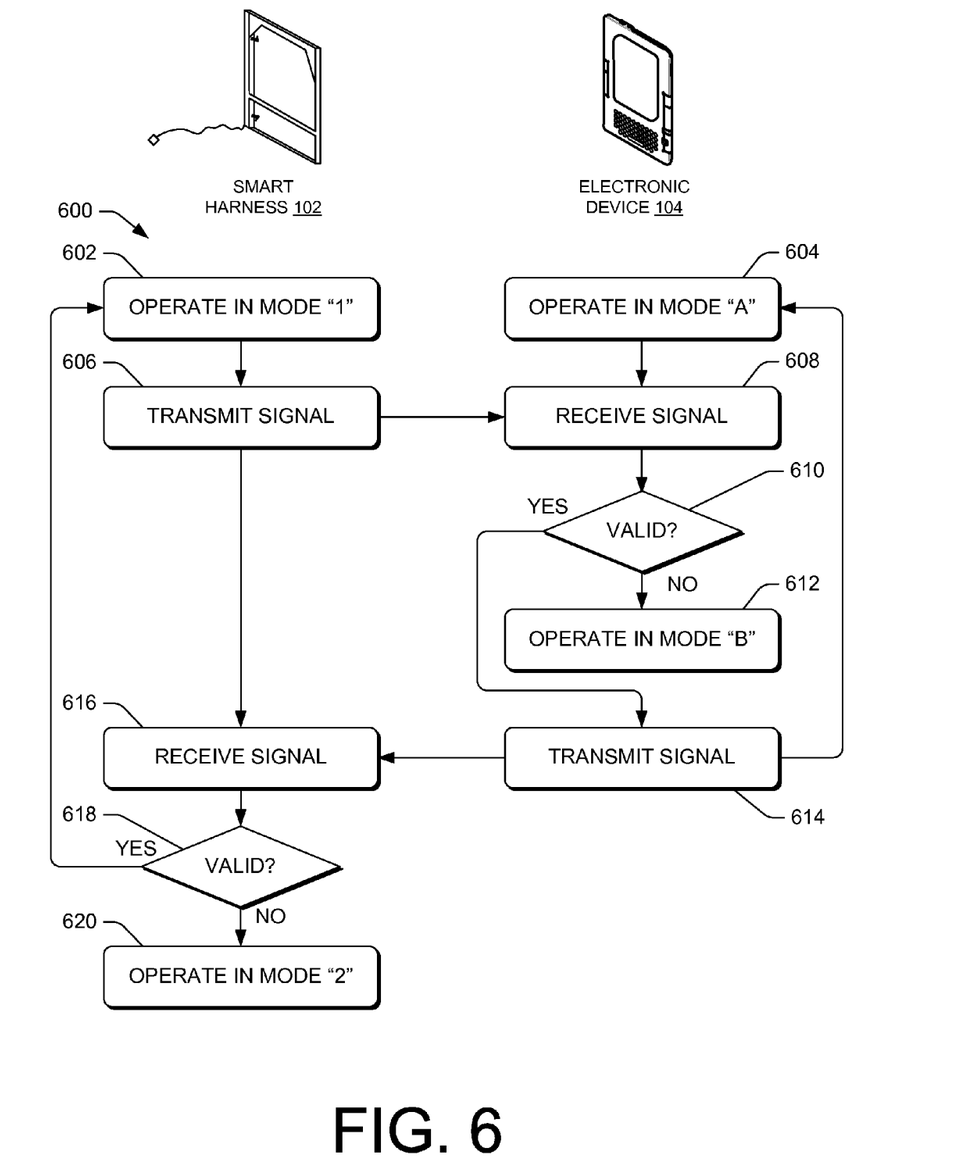
FIG. 6 is a flow diagram of another illustrative process to exchange data between a harness and an electronic device.

FIG. 6 is a flow diagram of illustrative process 600 to exchange bidirectional data between the harness 102 and the electronic device 104. The operations are listed under possible apparatus that may perform these operations. The order of the operations is not intended to be construed as a limitation, and any number of the described blocks can be combined in any order and/or in parallel to implement the process 600.

At 602, the harness 102 may operate in a mode "1" while at 604, while the electronic device 104 may operate in a mode "A". The modes of operation "1" and "A" may correspond to one of the secured state 106 or the unsecured state 108 described with reference to FIG. 1.

At 606, the harness 102 may transmit a signal to electronic device 104. The electronic device 104 may receive the signal at 608. The signal transmission (exchange) between the harness 102 and the electronic device 104 may be facilitated via the power/data connector(s) 122 and data port(s) 112, respectively, and via wired or wireless communications.

At 610, the electronic device may analyze and determine whether the signal received at 608 is valid using the device sensor 114 and the device controller 116. When the signal is not determined to be valid (e.g., existence of the signal, an authenticity of the signal, a timeliness of the signal, and/or other attributes of the signal), then the electronic device may begin operation in mode "B" at 612. When the signal is determined to be valid, the device controller 116 may transmit at signal (response) to the harness at 614, which may be received by the harness 102 at 616.

At 618, the harness 102 may determine a validity of the signal (response) received at 616. When the signal received at 616 is determined to be valid (e.g. authentic, timely, etc.), then the harness 102 may continue to operate in mode "1" at 602, and transmit the signal at 606 (e.g. a response). As such the process 600 may perform in a loop (operations 606-618) until an invalid signal is determined at 610 and/or 618.

When the signal received at 616 is determined to be invalid at 618, the harness controller 126 may instruct the harness 102 to operate in mode "2" at 620.

In an example configuration, the harness 102 may be coupled to the electronic device during an exam (test). When the harness 102 is coupled to the electronic device 104, mode "1" may include an emitting of light from the operational indicator 214 of the harness 102 while mode "A" may include restricted use of the electronic device 104 based on predetermined exam parameters (e.g., an exam mode). The exam parameters may include restricted use of the programs/modules 410 and/or the data 408, time limits, and so forth as determined or prescribed by an exam administrator. In mode "2" the harness 102 may emit a sound or take other action when the harness 102 is removed from the electronic device (or the signal transmission of blocks 614, 616 is interrupted). In mode "B" the electronic device 104 may operate in a normal mode (e.g., a full feature mode), a reduced feature mode, and so forth, when the harness 102 is removed from the electronic device (or the signal transmission of blocks 606, 608 is interrupted).

Figure 7:
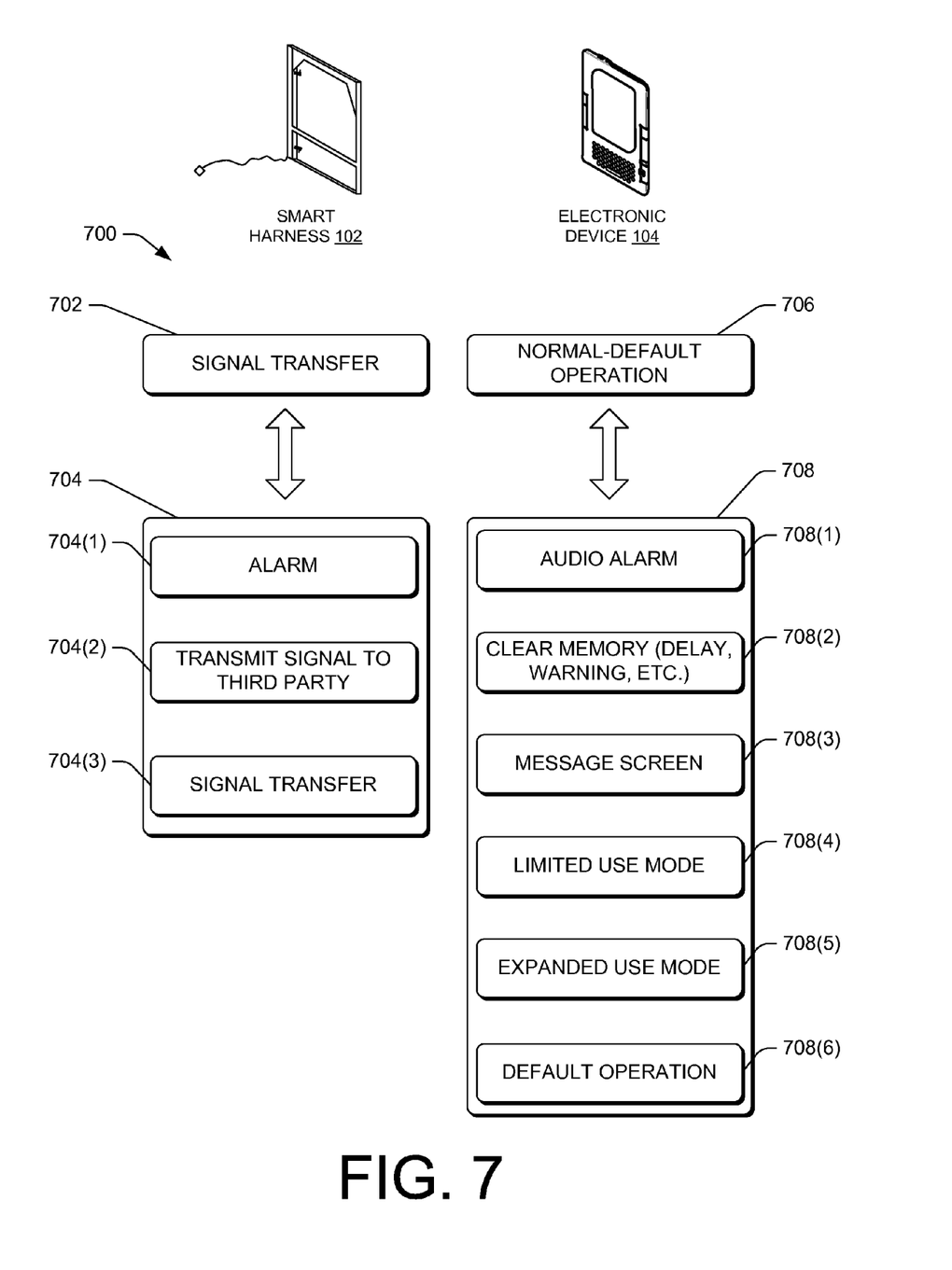
FIG. 7 is a flow diagram of an illustrative process to change operational modes of the harness and/or the electronic device.

FIG. 7 is a flow diagram of an illustrative process 700 to change operational modes of the harness 102 and/or the electronic device 104. As shown in FIG. 7, the harness 102 may operate in a first mode 702 (mode "1") and a second mode 704 (mode "2") of various possible modes of operation. Similarly, the electronic device 104 may operate in a first mode 702 (mode "A") and a second mode 708 (mode "B") of various possible modes of operation. Each of the possible modes of operation 702-708 is described in detail below. The harness 102 and/or the electronic device 104 may switch or transition between modes of operation via operations as described with reference to processes 500 and 600 described above.

With respect to the harness 102, each mode of operation 704(1), 704(2), and 704(3) may be performed at the first mode 702 or the second module 704 depending on the deployment of the harness. As shown in FIG. 7, and as a non-limiting example, the harness 102 may operate in a normal mode at the first mode 702 where the harness transmits and/or receives the signal as described in 504, 606, and/or 616 of FIGS. 5 and 6. In the signal transfer mode illustrated at the first mode 702, the harness 102 may not perform a user-perceivable activity. The harness 102 may perform in the second mode 704 as follows. At 704(1), the harness 102 may emit a sound (e.g., alarm, etc.) via the speaker 418. At 704(2), the harness 102 may transmit a signal to a third device (e.g., an administrator, security station, etc.). The signal may be a message regarding a state of the harness 102 with respect to the electronic device 104 (e.g., the secured state 106, the unsecured state 108, etc.) and/or detailed messaging (e.g., data received, time, power supply, etc.). At 704(3), the harness 102 may transmit the signal, as described above with reference to the operation 702 and/or activate the operational indicator 214.

It should be appreciated that any of the operations 704(1)-(3) may be performed in either of the first mode 702 or the second mode 704. Further, the operation in the second mode 704 may be any of the operations 704(1)-(3). For example, the harness 102 may operate in a first mode 702 of "alarm" (operation 704(1)) and a second mode 704 of "signal transfer" (operation 704(3)), among various possibilities or configurations.

Turning to the electronic device 104, each mode of operation 708(1), 708(2), 708(3), 708(4), 708(5), and 708(6) may be performed at the first mode 706 or the second module 708 depending on the deployment of the electronic device 104. As shown in FIG. 7, and as a non-limiting example, the electronic device 104 may operate in a normal-default operation mode at the first mode 702 where the electronic device receives and/or transmits the signal as described in 506, 608, and/or 614 of FIGS. 5 and 6. Continuing with the example, possible second modes of operation of the electronic device 104 are described next. However, each of these modes could also be implemented in the first mode 706.

At 708(1), the electronic device 104 may operate in an alarm mode. The alarm mode may include an emitting of a sound such as to alert others of an unauthorized use or displacement of the electronic device.

At 708(2), the electronic device 104 may clear a portion of memory. For example, the electronic device 104, via the device controller 116, may delete some or all of the programs/modules 410 and/or the data 408, which may reduce the value of the electronic device, disincentivize unauthorized use, protect sensitive data, and so forth.

At 708(3), the electronic device 104 may display a message. For example, the message may provide instruction on reactivating another mode (e.g., password request, etc.), a warning message to a user performing an unauthorized use or displacement (e.g., "return to base/harness", "This Device is Stolen!", etc.), and so forth.

At 708(4), the electronic device 104 may operate in a limited use mode. The limited use mode may be an exam mode, a library mode, a parental lock mode, a school mode, a retail display mode, a demonstration mode, and so forth. Each of these modes may have limited use of the programs/modules 410 accessible to the electronic device 104 based on the particular deployment and objectives of an administrator. For example, in an exam mode, a user of the electronic device 104 may not have Internet access, access to notes, and so forth. In another example, the library mode may restrict the data 408 that is accessible to the user (no comic books, explicit material, etc).

At 708(5), the electronic device 104 may operate in an expanded use mode. The expanded use mode may enable activation and/or use of data or functionality otherwise made unavailable. For example, the expanded use mode may enable the electronic device 104 to gain access to a database which is otherwise not available to the electronic device. In some instances, an attachment of the harness 200 may enable the use of the database, such as a card catalog that is accessible when the electronic device 300 is attached to the harness 200 in a library setting.

At 708(6), the electronic device 104 may perform in a default operation. The default operation may be a fully functional operation or another variation of operability of (or access to) the various programs/modules 410 and the data 408 loaded on or accessible by the electronic device 104.

It should be appreciated that any of the operations 708(1)-(6) may be performed in either of the first mode 706 or the second mode 708. Further, the operation in the second mode 708 may be any of the operations 708(1)-(6). For example, the electronic device 104 may operate in a first mode 704 of "limited use mode" (operation 708(4)) and a second mode 708 of "audio alarm" (operation 708(1)), among various possibilities.

Illustrative Harness Base System

Figure 8:
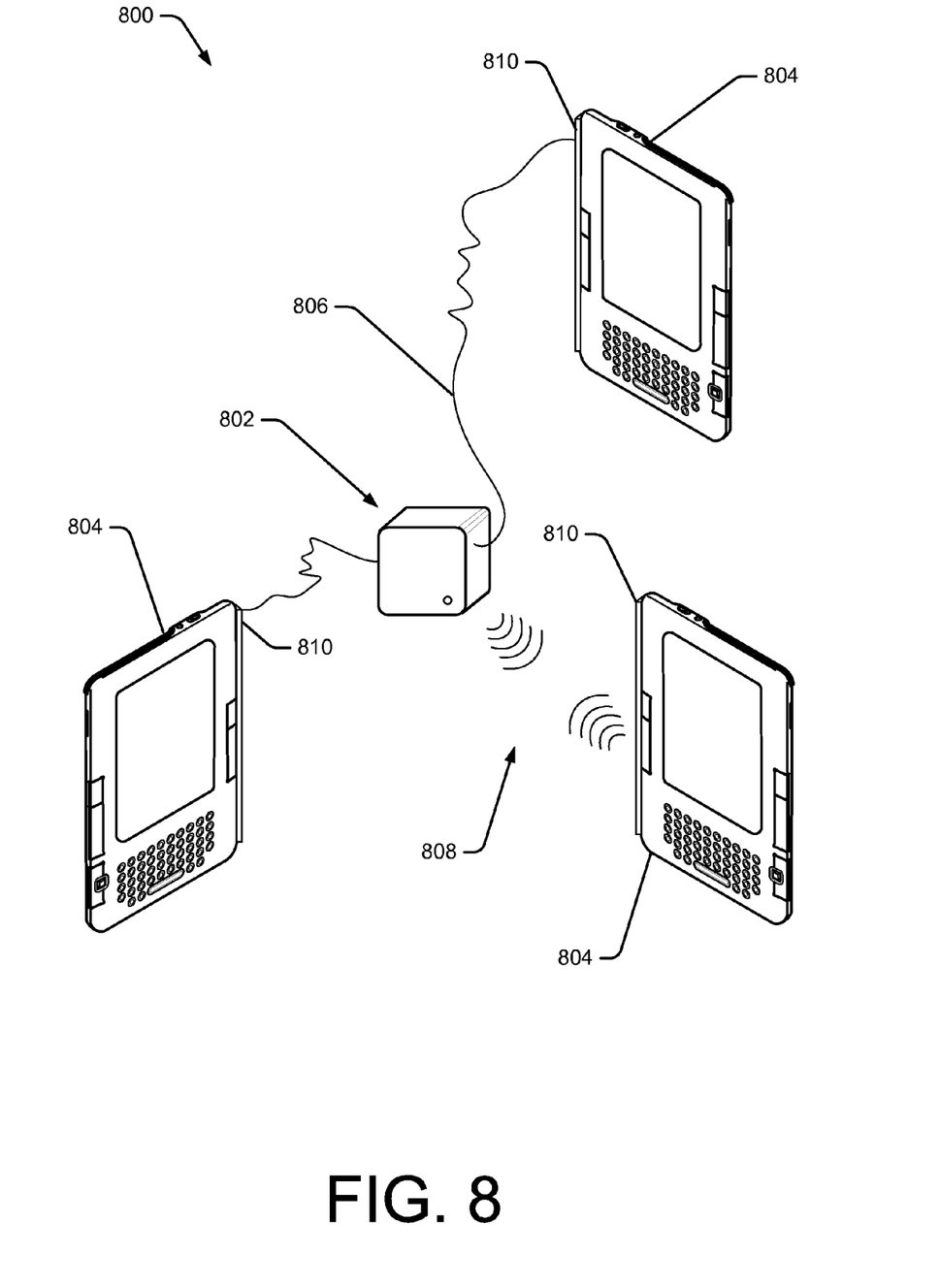
FIG. 8 is a schematic perspective view of a harness base system having a centralized base configured to exchange signals with multiple electronic devices.

FIG. 8 is a schematic perspective view of a harness base system 800 having a centralized base 802 configured to exchange signals with multiple electronic devices. The centralized base 802 may exchange signals with the electronic devices 804 via a wired connection 806 and/or a wireless connection 808.

The harness base system 800 may include harness attachments 810 that attach to the electronic devices 804. In some embodiments, the harness attachments 810 may be customized to securely couple to one or more different types of the electronic devices 804. When the harness attachment 810 is securely coupled to the electronic device, the centralized base 802 may facilitate an exchange of signals with the electronic devices 804. In some embodiments, the harness attachment, by way of secure attachment to the electronic device, may activate additional features of the electronic device. For example, the harness attachment 810, when securely coupled to the electronic device 804, may depress a control or otherwise instruct the electronic device to exchange signals with the centralized base 802. In this way, a single instance of the harness signal logic may be implemented in the centralized base to support a group of the electronic devices 804. The harness base system 800 may otherwise provide the same or similar operability with the electronic devices as described herein, and in particular, in the processes 500, 600, and 700.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a harness to securely attach to an electronic device, the harness including:
        a tether to physically secure the harness to an anchor to prevent displacement of the harness and an attached electronic device from a predetermined location; and
        a data connector to enable transmission of a signal from the harness and to the attached electronic device; and
    an electronic device configured to be securely attached to the harness, the electronic device including:
        a processor;
        memory to store instructions executable by the processor; and
        a data port to receive the signal from the harness, the instructions causing the electronic device to (1) operate in a first mode of operation when the data port connects to the data connector such that the electronic device receives the signal from the harness, and (2) operate in a second mode of operation that is different than the first mode when the data port does not connect to the data connector such that the electronic device does not receive the signal from the harness.

2. The system as recited in claim 1, wherein the first mode of operation is a full-feature mode of operation and the second mode of operation is a reduced functionality mode of operation.

3. The system as recited in claim 1, wherein the electronic device includes a display, and wherein the first mode of operation or the second mode of operation includes rendering content on the display indicating a presence or absence of the signal.

4. The system as recited in claim 1, wherein the electronic device includes a speaker, and wherein the first mode of operation or the second mode of operation includes emitting a sound using the speaker to indicate a presence or absence of the signal.

5. The system as recited in claim 1, wherein the data connector is a universal serial bus (USB) connector.

6. A method performed at least in part by an electronic device, the method comprising:
    receiving a signal from a harness securely coupled to the electronic device, the signal to indicate a security status of the electronic device;
    operating in a first mode for a predetermined duration after receiving the signal from the harness; and
    operating in a second mode upon expiration of the predetermined duration and an omission of another instance of the signal during the predetermined duration, the operating in the second mode reducing a quantity of available functions of the electronic device as compared to a quantity of available functions of the electronic device operating in the first mode.

7. The method as recited in claim 6, wherein the predetermined duration is extended by a receipt of another instance of the signal from the harness.

8. The method as recited in claim 6, wherein the second mode includes at least one of:
    transmitting a signal to a third party to indicate a status of the harness or the electronic device,
    sounding an alarm, or displaying a message to request a user to reset the functionality of the electronic device.

9. The method as recited in claim 6, wherein the signal is transmitted via a wired connection between the harness and the electronic device.

10. The method as recited in claim 6, further comprising transmitting a response signal to the harness to confirm a current operational mode of the electronic device.

11. The method as recited in claim 6, wherein the second mode includes deleting at least one of data, programs, or modules from memory of the electronic device.

12. The method as recited in claim 6, wherein the electronic device is an electronic book (eBook) reader device capable of communicating with the harness via wired or wireless data transmissions.

13. The method as recited in claim 6, wherein the predetermined duration is greater than zero seconds.

14. A method comprising:
   transmitting a signal from a harness to an electronic device physically secured to the harness, the signal to initiate a first mode of operation of the electronic device that terminates after an absence of the signal for a predetermined duration;
   receiving a reply signal from the electronic device in response to the transmitted signal; and
   upon the absence of the reply signal for the predetermined duration, performing at least one of
      emitting an audible alarm, or
      transmitting a message to a third device to notify the third device of the absence of the reply signal.

15. The method as recited in claim 14, further comprising sensing a location of the harness within a predetermined boundary, and wherein the transmitting the signal to the electronic device is contingent upon the location.

16. An electronic device comprising:
   a housing;
   a locking fixture integrally formed in the housing to enable attachment of a security harness to the electronic device;
   a data port to receive a signal from the security harness when attached to the electronic device; and
   a controller to instruct the electronic device to operate in a first powered mode during receipt of the signal and a second powered mode during an absence of the signal.

17. The electronic device as recited in claim 16, wherein the electronic device is an electronic book (eBook) reader device.

18. The electronic device as recited in claim 16, wherein the signal is received intermittently at a fixed duration, and wherein the controller instructs the electronic device to operate in the second mode during the absence of the signal after an expiration of the fixed duration since a last signal.

19. The electronic device as recited in claim 16, wherein the security harness provides a supply of power to the electronic device, and wherein the providing of the supply of power from the security harness to the electronic device acts as the signal.

20. The electronic device as recited in claim 16, wherein the data port transmits a reply signal to the security harness in response to the receipt of the signal.

21. An apparatus to securely couple to and restrain an electronic device, the apparatus comprising:
   a body formed to partially cover the electronic device to securely couple to the electronic device;
   a data connector to transmit a first signal to the electronic device when the electronic device is secured by the body; and
   a controller to transmit a second signal to at least one of an emitting device or a third device when the electronic device is removed from the body.

22. The apparatus as recited in claim 21, further comprising:
   a tether to connect the apparatus to an anchor; and
   a power supply configured to provide electricity to the electronic device.

23. The apparatus as recited in claim 21, wherein the data connector is configured to transmit a wireless signal as one of the first signal or the second signal, the wireless signal transmitted to at least one of the electronic device or the third device to indicate a status of the harness with respect to the electronic device.

24. The apparatus as recited in claim 21, further comprising an operational indicator that indicates when the apparatus successfully transmits the first signal to the electronic device.

25. The apparatus as recited in claim 21, wherein the data connector is configured to receive a response signal from the electronic device.

26. The apparatus as recited in claim 25, further comprising a speaker in communication with the data connector and the controller, the speaker to emit an audible sound during an absence of the response signal.

27. A method performed at least in part by an electronic device, the method comprising:
   receiving a signal from a harness coupled to the electronic device;
   operating in a first mode for a predetermined duration after receiving the signal from the harness; and
   operating in a second mode that is different than the first mode upon expiration of the predetermined duration and an omission of another instance of the signal during the predetermined duration, the operating in the second mode increasing a quantity of available functions of the electronic device as compared to a quantity of available functions of the electronic device operating in the first mode.

28. The method as recited in claim 27, wherein the operating in the first mode blocks access to at least a portion of data stored on the electronic device and operating in the second mode enables access to at least the portion of the data stored on the electronic device.

* * * * *